United States Patent [19]

Brigham

[11] Patent Number: 4,954,740
[45] Date of Patent: Sep. 4, 1990

[54] STATOR WINDING FOR TWO-SPEED ELECTRODYNAMIC MACHINES HAVING FRACTIONAL SPEED RATIOS

[75] Inventor: Robert N. Brigham, Monroe, Conn.

[73] Assignee: The Superior Electric Company, Bristol, Conn.

[21] Appl. No.: 112,781

[22] Filed: Oct. 27, 1987

[51] Int. Cl.⁵ ............................................. H02K 1/00
[52] U.S. Cl. ..................................... 310/185; 310/179; 310/188; 310/254; 318/773
[58] Field of Search ................ 310/208, 185, 216, 218, 310/254, 49 R, 259, 179, 180, 166, 184, 68 A, 162, 164, 68 R, 68 B; 318/773; 322/32, 29

[56] References Cited

U.S. PATENT DOCUMENTS

| | | | |
|---|---|---|---|
| 2,041,875 | 5/1936 | Stoller | 310/185 EEX |
| 2,715,204 | 8/1955 | Siskind | 318/773 |
| 2,820,938 | 1/1958 | Davies | 318/773 |
| 4,733,113 | 3/1988 | Smith | 310/49 R |
| 4,792,709 | 12/1988 | Smith | 310/49 R |

FOREIGN PATENT DOCUMENTS

| | | | |
|---|---|---|---|
| 0054255 | 6/1982 | European Pat. Off. | 318/773 |
| 1105045 | 4/1961 | Fed. Rep. of Germany | 318/773 |
| 0048110 | 10/1981 | Japan | 318/773 |
| 0140451 | 9/1921 | United Kingdom | 318/773 |
| 2031660 | 4/1980 | United Kingdom | 318/773 |

OTHER PUBLICATIONS

Frictional Horsepower Electric Moters; C. G. Veinott; McGraw Hill Book Co., Inc.; New York, Toronto, London; 1948; pp. 54–57, 98–101.

*Primary Examiner*—R. Skudy
*Attorney, Agent, or Firm*—John H. Crozier

[57] ABSTRACT

A stator for electrodynamic machines provides for more efficient design by reducing the total number of stator legs required for two-speed, two-phase motors and for generators producing electrical power at either of two frequencies while operating at a constant speed. This is accomplished by external switching, so that at one condition, all coils on all stator legs are energized in the normal symmetrical pattern, while at the other condition, all coils on all stator legs are energized in a nonsymmetrical pattern.

3 Claims, 4 Drawing Sheets

STATOR WINDING FOR TWO-SPEED ELECTRODYNAMIC MACHINES HAVING FRACTIONAL SPEED RATIOS

BACKGROUND OF THE INVENTION

1. Field of the Invention

This invention relates to electrodynamic machines generally, and, more particularly to a novel stator winding configuration which permits operation of a two-phase A.C. motor in either of two speeds, while energizing all of the coils on the stator when operating at each speed. When applied to a generator, either of two frequencies may be produced when the generator is operated at a constant speed, using all of the coils on the stator.

2. Background Art

While the present invention is described as being applied to two-speed motors, it will be understood that it is useful as well when applied to A.C. generators to produce either of two frequencies when operated at a constant speed.

Two-speed A.C. motors of either the synchronous or the induction type have numerous applications, including use in refrigeration systems, motion control, fans, and other applications where a relatively large step change in speed is advantageous. Conventionally, the speed of such motors is changed by switching from one set of stator coils to another, with one set of coils energized to provide one speed and the other set of coils energized to provide the other speed.

In an A.C. motor, the minimum number of legs on the stator is equal to the number of stator magnetic poles times the number of phases. If one wished to have an A.C. motor with two nominal speeds of 1200 and 1800 rpm operated from a rwo-phase 60 Hz. power supply, it can be seen through the known relationship of speed =(120× frequency)/number of poles, where a "pole" comprises the number of adjacent legs having the same magnetization at a given time, that a 24-leg motor would be required, since the minimum number of legs for 1200 rpm operation is 12 and the minimum number of legs for 1800 rpm operation is 8, with the lowest number divisible by 12 and 8 being 24. The motor would be wound with one set of coils on every set of two adjacent legs for 1200 rpm operation and with a second set of coils on every set of three adjacent legs for 1800 rpm operation. Thus, a two-speed motor, two-phase motor of the conventional type would typically require 48 separate coils.

Accordingly, it is a principal object of the present invention to provide a two-speed A.C. motor which minimizes the number of stator legs required.

It is another object of the present invention to provide a two-speed A.C. motor in which all stator coils are energized at each speed.

Other objects of the present invention will, in part, be obvious and will, in part, be apparent from the following description.

SUMMARY OF THE INVENTION

The present invention provides for a more efficient design by reducing the total number of stator legs required for two-speed operation and, likewise, reducing the total number of coils required. This is accomplished by external switching, so that, at the lower of the two speeds, all legs are energized in the normal, symmetrical pattern, while, at the higher of the two speeds, the legs are energized in a non-symmetrical pattern. On an embodiment of the present invention described, a motor with a twelve-leg stator is operated as a two-phase, two-speed (1200/1800 rpm) motor. An important feature of the present invention is that all coils are energized at each speed, thus making more efficient use of the energizing coils and providing a motor that is lighter and more easily manufactured.

DETAILED DESCRIPTION OF THE PREFERRED EMBODIMENT

Figure 1:
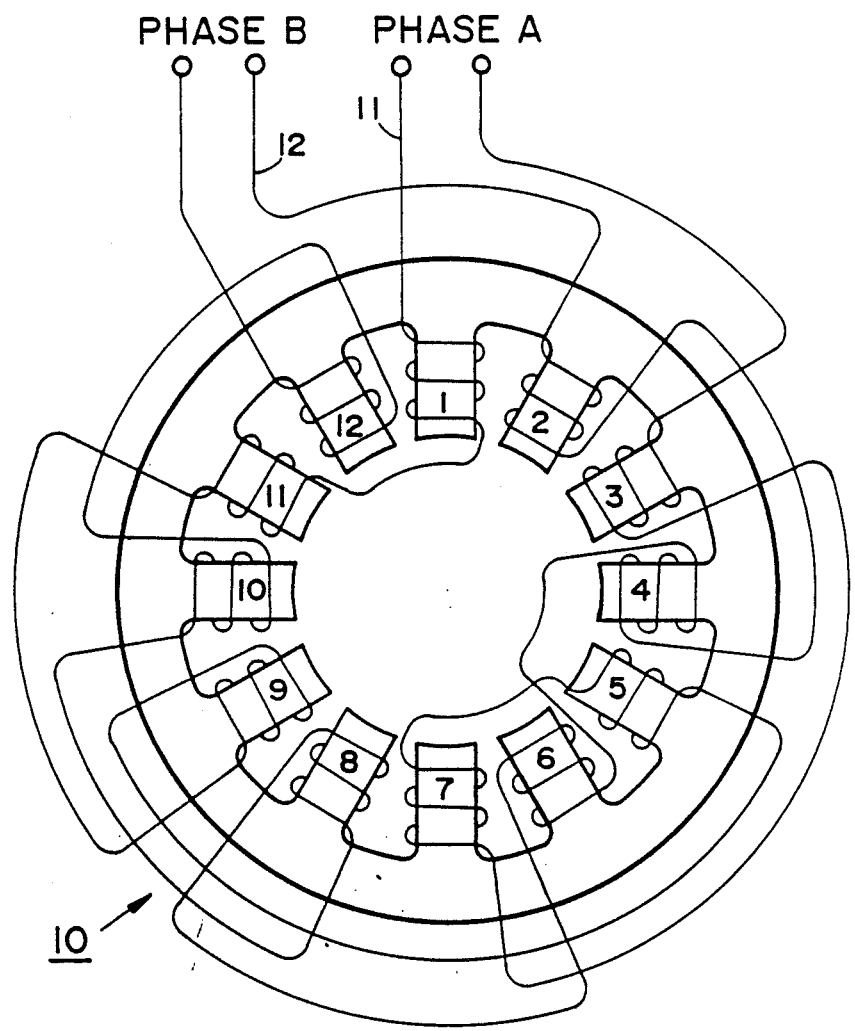
FIG. 1 shows a motor stator according to the present invention which produces a 1200 rpm nominal speed.

Referring now to the Drawing, FIG. 1 shows a 12-leg stator 10 wound, according to the present invention, to produce a nominal speed of 1200 rpm of a rotor (not shwon) when excited with a two-phase power supply (not shown). A conductor 11 from Phase A is first wound about leg No. 1 to produce, say, a N magnetization of that leg with positive current, then serially, about leg No. 11 to produce a S magnetization of that leg. Conductor 11 is then, serially wound about leg No. 9 for N magnetization; leg No. 5 for N magnetization; leg No. 7 for S magnetization; leg No. 3 for S magnetization; and then returns to Phase A. Similarly, a conductor 12 from Phase B is wound about leg No. 2 to produce, say, a N magnetization of that leg. Conductor 12 is then, serially, wound about legs 4, 6, 8, 10, and 12 to produce magnetization of those legs of N, S, N, S, N, and S, respectively, with a positive current.

Figure 2:
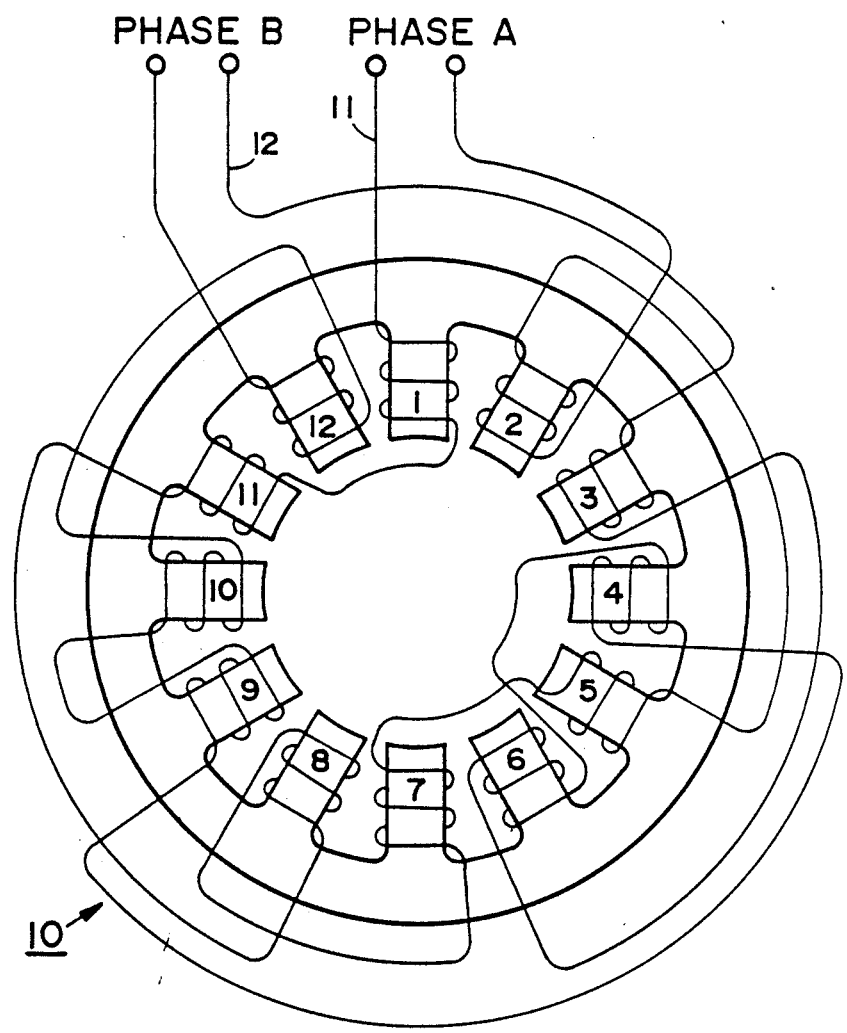
FIG. 2 shows a motor stator according to the present invention which produces a 1800 rpm nominal speed.

FIG. 2 shows stator 10 wound to produce a nominal speed of 1800 rpm of the rotor with the two-phase power supply. Here, the winding configuration has been changed from that of FIG. 1, through a conventional external switching network (not shown), so that conductor 11 from Phase A is serially wound about legs 1, 11, 8, 7, 5, and 2 to produce energizations of those legs of N, S, N, N, S, and N, respectively, with a positive current; and conductor 12 from Phase B is serially wound about legs 3, 6, 4, 9, 10, and 12 to produce magnetizations of those legs of N, S, N, N, and S, respectively, with a positive current.

Figure 3:
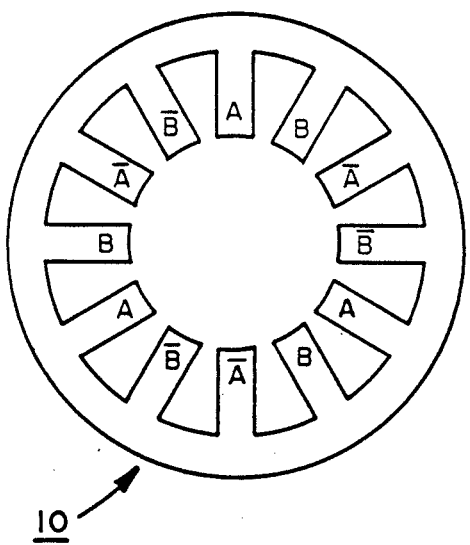
FIG. 3 shows the phase relationship of the embodiment of FIG. 1.
Figure 4:
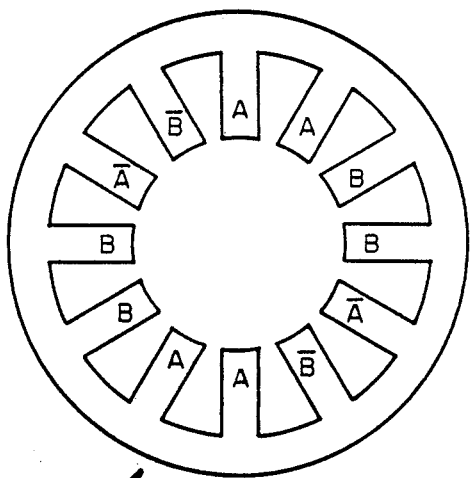
FIG. 4 shows the phase relationship of the embodiment of FIG. 2.

FIG. 3 shows the stator leg magnetizations described above at a given instant of time with reference to FIG. 1 for the winding configuration to prc luce a nomianal speed of 1200 rpm and FIG. 4 shows the pole magnetizations described above at a given instant of time with reference to FIG. 2 for the winding configuration to produce a nominal speed of 1800 rpm. For greater clarity, FIGS. 3 and 4 do not show the winding on stator 10.

A generalized relationship for the embodiment of the present invention described above is shown in the following table, where p is the number of pairs of stator poles and n is zero or an integer:

| Low-Speed Winding | | |
|---|---|---|
| Leg No. | Phase | Polarity |
| 1 + 4n (n = O, p') | A | + |
| 2 + 4n (n = O, p') | B | + |
| 3 + 4n (n = O, p') | A | − |
| 4 + 4n (n = O, p') | B | −, |

| High-Speed Winding | | |
|---|---|---|
| Leg No. | Phase | Polarity |
| 1 + 6n (n = O, p) | A | + |
| 2 + 6n (n = O, p) | A | + |
| 3 + 6n (n = O, p) | B | + |
| 4 + 6n (n = O, p) | B | + |
| 5 + 6n (n = O, p) | A | − |
| 6 + 6n (n = O, p) | B | −, | where p' = 1.5 p-.
where p ≧ 2.

Figure 5:
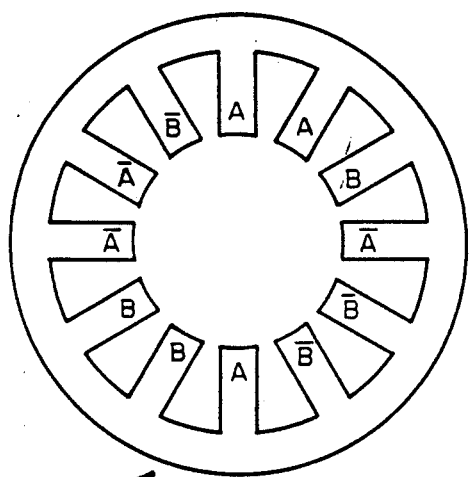
FIG. 5 shows the stator leg magnetizations for an alternative embodiment of FIG. 2.

FIG. 5 shows, also unwound, the magnetizations produced at a given instant of time be an alternative winding configuration (not shown) for a nominal speed of 1800 rpm.

Figure 6:
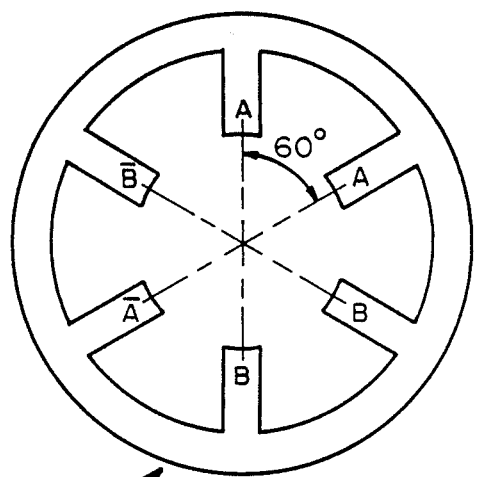
FIG. 6 shows a simplified motor stator of the present invention, reduced to one-half of the stator of FIG. 2.
Figure 7:
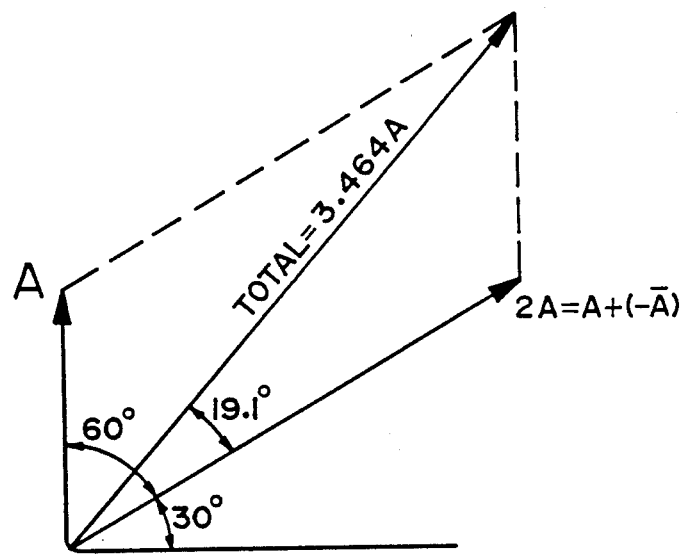
FIGS. 7 and 8 illustrate the theory of operation of a two-phase motor constructed according to the present invention.
Figure 8:
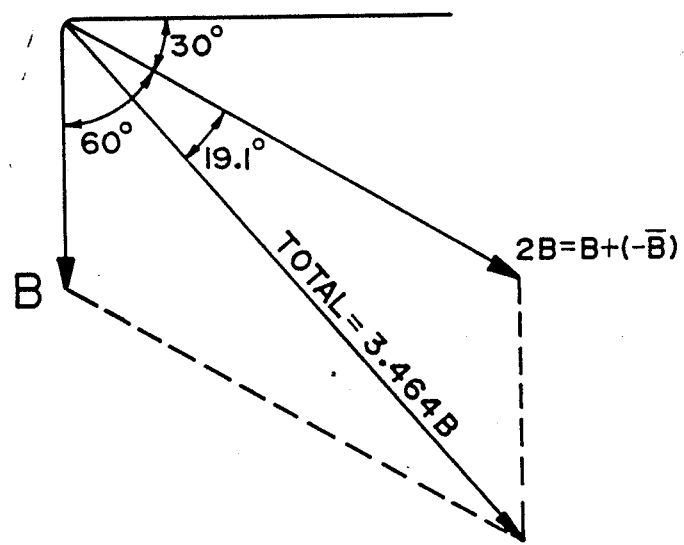

The theory of operation of the 4-pole, 1800-rpm configuration can be seen with reference to FIGS. 6, 7, and 8.

FIG. 6 comprises legs 1 through 6 of the stator of FIG. 2 separated so as to form the stator of a two-pole, two-phase motor, with the legs separated by electrical and mechanical angles of 60 degrees.

FIG. 7 is a vector diagram showing the "A" phase energized and FIG. 8 is a vector diagram showing the "B" phase energized. It can be seen that the phase angle between phases "A" and "B" is 2×(19.1 degrees +30 degrees)=98.2 degrees which is close to the ideal of 90 degrees. Thus, the winding of the present invention results in a rotating field when excited from a two-phase power supply. The small difference between actual and ideal phase angles would result in a torque loss of only about one percent. A motor constructed as described could, of course, also be operated from a single-phase power supply by using an appropriate phase-shifting network.

It will be understood from the foregoing description and inspection of FIGS. 1 and 2 that all magnetic stator poles of a motor constructed according to the present invention are "true" poles, in contrast to "consequent" poles, as all such magnetic poles are formed on legs of the stator by the passage of electric currents through coils wound on the legs.

It can be seen that the present invention, in the embodiment described, provides a motor having only one-fourth the number of coils of a conventionally constructed motor, resulting in more efficient use of materials and a more easily manufactured motor.

It will be understood that the scope of the present invention is not limited to the embodiments described, but may be applied as well by one skilled in the art to motors having other construction and operating parameters; and, may be applied as well by one skilled in the art to generators to produce either of two frequencies while operating at a constant speed.

Thus, it will be understood that what has been disclosed is a novel stator winding configuration which permits operation of a two-phase A.C. motor in either of two speeds, while energizing all coils on the stator when operating at each speed.

It is thus seen that the objects set forth above, as well as those made apparent from the foregoing description, are efficiently attained and since certain changes may be made in carrying out the above invention without departing from the scope thereof, it is intended that all matter contained in the above description or shown in the accompanying Drawing shall be interpreted as illustrative and not in a limiting sense.

It is also intended that the following Claims are intended to cover all of the generic and specific features of the invention herein described, and all statements of the scope of the invention which, as a matter of language, might be said to fall therebetween.

I claim:

1. A stator for an A.C. motor, comprising: a plurality of legs, each leg having wound thereon an energizing coil, said coils being serially connected in one of two phases, in one of first and second conditions, to produce the polarities in the following table, where p= the number of stator pole pairs and n= all integers from 2 to p, inclusive:

| First Condition | | |
|---|---|---|
| Leg No. | Phase | Polarity |
| 1 + 4(p' − n) | A | + |
| 2 + 4(p' − n) | B | + |
| 3 + 4(p' − n) | A | − |
| 4 + 4(p' − n) | B | −, |

| Second Condition | | |
|---|---|---|
| Leg No. | Phase | Polarity |
| 1 + 6(p − n) | A | + |
| 2 + 6(p − n) | A | + |
| 3 + 6(p − n) | B | + |
| 4 + 6(p − n) | B | + |
| 5 + 6(p − n) | A | − |
| 6 + 6(p − n) | B | −, | where p' = 1.5 p;
where p ≧ 2.

2. An A.C. motor, having first and second speeds with a fractional speed ratio, excited by a two-phase power supply, for connection to switching means, comprising:
 (a) a rotor;
 (b) a stator having first through twelfth legs, each leg having wound thereon an energizing coil to produce a magnetic pole, said magnetic pole being formed on said leg by means of electric current flowing through said coil, such that all such poles formed are true poles for each said speed; and
 (c) under a first condition, when said coils on said first, eleventh, ninth, fifth, seventh, and third legs are serially connected to a first phase of said power supply to produce, respectively, N, S, N, S, N, and S magnetizations of those legs, with application of a positive current, and said coils on said second, fourth, sixth, eighth, tenth, and twelfth legs are serially connected to a second phase of said power supply to produce, respectively, N, S, N, S, N, and S magnetizations of those legs with application of a positive current; said motor will operate at the lower of said first and second speeds when excited by said two-phase power supply;

(d) under a second condition, when said coils on said first, eleventh, eighth, seventh, fifth, and second legs are serially connected to a first phase of said power supply to produce, respectively, N, S, N, N, S, and N magnetizations of those legs with application of a positive current, and said coils on said third, fourth, sixth, ninth, tenth, and twelfth legs are serially connected to a second phase of said power supply to produce, respectively, N, N, S, N, N, and S magnetizations of those legs with a positive current; said motor will operate at the higher of said first and second speeds when excited by said two-phase power supply; and (e) said switching means connects all said coils to selectively produce either of said first and second conditions.

3. An A.C. motor, having first and second speeds with a fractional speed ratio, excited by a two-phase power supply, for connection to switching means, comprising:

(a) a rotor;

(b) a stator having first through twelfth legs, each leg having wound thereon an energizing coil to produce a magnetic pole, said magnetic pole being formed on said leg by means of electric current flowing through said coil, such that all such poles formed are true poles for each said speed; and (c) under a first condition, when the coils on said first, eleventh, ninth, seventh, fifth, and third legs are serially connected to a first phase of said power supply to produce, respectively, N, S, N, S, N, and S magnetizations of those legs, with application of a positive current, and said coils on said second, fourth, sixth, eighth, tenth, and twelfth legs are serially connected to a second phase of said power supply to produce, respectively, N, S, N, S, N, and S magnetizations of those legs with application of a positive current; said motor will operate at the lower of said first and second speeds when excited by said two-phase power supply;

(d) under a second condition, when the coils on said first, second, fourth, seventh, tenth, and eleventh legs are serially connected to a first phase of said power supply to produce, respectively, N, N, S, N, S, and S magnetizations of those legs, with application of a positive current, and said coils on said third, fifth, sixth, eighth, ninth and twelfth legs are serially connected to a second phase of said power supply to produce, respectively, N, S, S, N, N, and S magnetizations of those legs with application of a positive current; said motor will operate at the lower of said first and second speeds when excited by said two-phase power supply; and (e) said switching means connects all said coils to selectively produce either of said first and second conditions.

* * * * *